United States Patent [19]

Ching

[11] Patent Number: 4,629,950
[45] Date of Patent: Dec. 16, 1986

[54] VARIABLE AUTOMATIC FORWARD/REVERSE CONTROL DEVICE FOR BABY CART

[76] Inventor: Huang C. Ching, 320, Nan Chon Village, San Sung Hsiung, Tainan Hsian, Taiwan

[21] Appl. No.: 780,827

[22] Filed: Sep. 27, 1985

[51] Int. Cl.$^4$ ............................................. H02P 1/22
[52] U.S. Cl. ..................... 318/285; 318/280; 318/283; 318/293; 318/139; 180/166; 280/47.1
[58] Field of Search ............... 318/139, 280, 281, 283, 318/285, 287, 291, 293, 256; 180/65.1, 166; 280/47.1, 651

[56] References Cited

U.S. PATENT DOCUMENTS

| | | | |
|---|---|---|---|
| 3,820,614 | 6/1974 | Askinazy | 180/166 |
| 4,303,872 | 12/1981 | Alf et al. | 318/280 X |
| 4,306,180 | 12/1981 | Moore et al. | 318/280 |

FOREIGN PATENT DOCUMENTS

| | | | |
|---|---|---|---|
| 0125410 | 9/1947 | Australia | 318/280 |
| 0454027 | 1/1949 | Canada | 318/280 |
| 2552808 | 6/1977 | Fed. Rep. of Germany | 180/166 |

Primary Examiner—William M. Shoop, Jr.
Assistant Examiner—Bentsu Ro
Attorney, Agent, or Firm—Shoemaker and Mattare, Ltd.

[57] ABSTRACT

This invention is a variable automatic forward/reverse control device for an unattended baby cart which is particularly designed for the housewife who is too busy at home to take care of her baby in the cart. Placing the baby in this cart equipped with this control device and taking advantage of the device may make this cart automatically advance a preset distance and then automatically back a preset distance, without worrying about this cart ramming against a room wall or some stationary objects indoors. Thus, the baby will feel quite safe and not cry. In addition, this cart may be provided with music to let the housewife use her spare time to do some handicraft or other chores. Furthermore, the timing equipment or rang-finding computer in the control device may be adjusted to close to zero time so that this cart can slightly vibrate to-and-from in situ so that in such circumstances, the baby will not cry.

5 Claims, 5 Drawing Figures

VARIABLE AUTOMATIC FORWARD/REVERSE CONTROL DEVICE FOR BABY CART

BACKGROUND OF THE INVENTION

It is well known that the conventional baby cart is manually pushed forward or back, and mainly used outdoors, with very often no other purpose. Normally, a housewife who fosters her baby (still in infancy and impossible to walk) at home carries it on her back or places it in a bed or cradle so that she can do her chores or some handicraft.

Carrying the baby on the housewife's back will hinder the operations of her extremities. Once in a while she carelessly may mistakenly collide the baby with something. The baby placed in a stationary bed or cradle will feel lonely and cry before long. Even if it is placed in a powered cradle with a regular swing, it feels no security and may cry after a while. The inventor personally experienced such conditions, has interviewed a number of housewives who have the same sensation, and firmly believes that everyone would agree.

SUMMARY OF THE INVENTION

In view of the above, in order to enhance a plurality of variable functions of the manually-pushed conventional baby cart, in order to let the housewife do her chores and other business without worry, in order to let the baby in the cart not feel fear and boredom and cry because of loneliness and monotony, in order to save cost and achieve economic utility, and in order to achieve the expected effect of production in keeping with the basic construction of a baby cart, this invention offers a drive control device providing a plurality of variable movements for the baby cart. A sample of this invention has been made capable of entirely achieving the foregoing purposes and functions through countless operations and tests which indicate that this invention is novel and practical in reality.

Therefore, this invention is related to a variable control device for a baby cart. Specifically, this invention is a drive control device with a plurality of variable movements for the conventional stationary and dull baby cart. When it is used indoors, it is unnecessary to have somebody keeping an eye on this cart, which can automatically advance and retreat, and also slightly vibrate in situ, so that the baby in the cart feels movement and will not cry because of feeling lonely, and the housewife can do her chores as she likes. In addition, when it is used outdoors, this cart can be powered to drive forward or back slowly without being pushed manually. In a word, this invention with simple structure and low cost is extremely practical.

The baby cart with such a drive control device having a plurality of variable movements of this invention can achieve the following novel and practical purposes and functions, at least:

1. To drive the baby cart forward, straight forward or up to a preset distance.
2. To drive the baby cart back, all the way or up to a preset distance.
3. To automatically drive the baby cart forward, then automatically back, and then automatically forward in a manner of automatic reciprocation; the forward and reverse distance may be adjusted in line with the actual situation indoors.
4. To slightly vibrate to-and-for in situ.
5. To be equipped with music or other acoustic and lamp devices.

DETAILED DESCRIPTION OF THE PREFERRED EMBODIMENT

Figure 1:
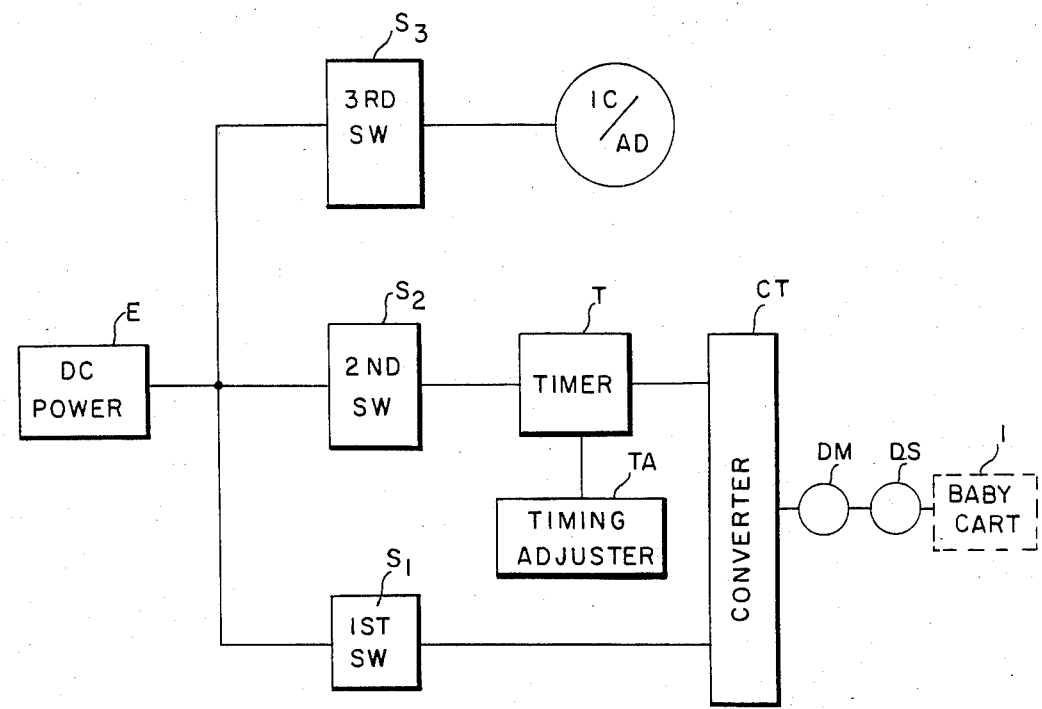
FIG. 1 is a block chart of various structural units of the control device of the present invention.

As shown in FIG. 1, the drive control device having a plurality of variable movements for the baby cart (1) consists of the following units:

A dc power source E: to provide various control units and dc drive motor DM with power which may be a storage battery or a dry cell;

A first switch $S_1$: to directly provide the dc motor DM with the power source E so as to make the motor DM rotate in a single direction;

A second switch $S_2$: to control a timer T, i.e., to provide the timer T with power from source E;

A third switch $S_3$: as an accessory, but not an essential part of this invention, to provide the music IC or other acoustic or lamp device AD with power from source E so as to generate music, acoustics or light;

A timer T: to set off a signal when the preset time is up and change the state of energized junction point (or state) converter CT;

A junction point (or state) converter CT: there are two sets of normal closed (N.C.) and normal opened (N.O.) junction points respectively, or there may be two sets of electronic components capable of switching On/Off states, to be energized by the signal from the timer T;

A mini-type dc motor DM: it may be available to generate a very small amount of power. This invention utilizes a 4.5 V 750MA motor for driving a 50 kg baby cart (at most) by a 6 V power source for a dozen hours;

A speed reducer DS: to be in gear with the dc motor DM of which the rotational speed determines reducing speed. The transmission shaft of the speed reducer is connected to a frame bar of the baby cart (1), such as a cross bar (11) on the lower rear of the cart, so as to actuate this cart; and A timing adjuster TA: to adjust the time of timer T finely (or roughly).

Figure 5:
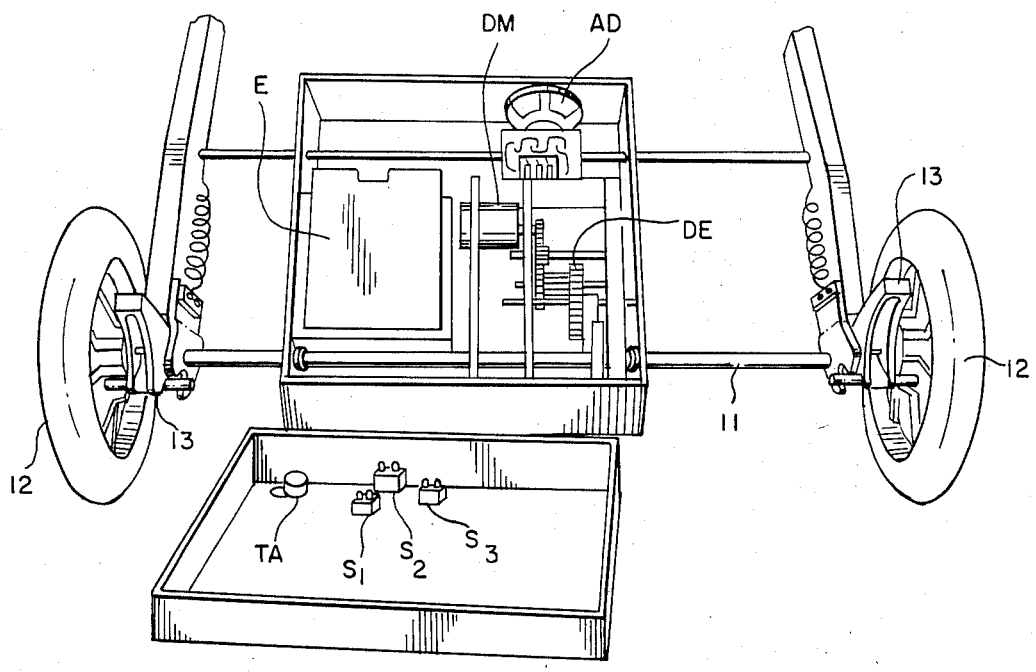
FIG. 5 is an elevation view of part A of FIG. 4 after opening the cover.

The foregoing various members are assembled in a case 2 which is installed on the rear cross bar 11 (see FIG. 5) of the baby cart 1.

Figure 2:
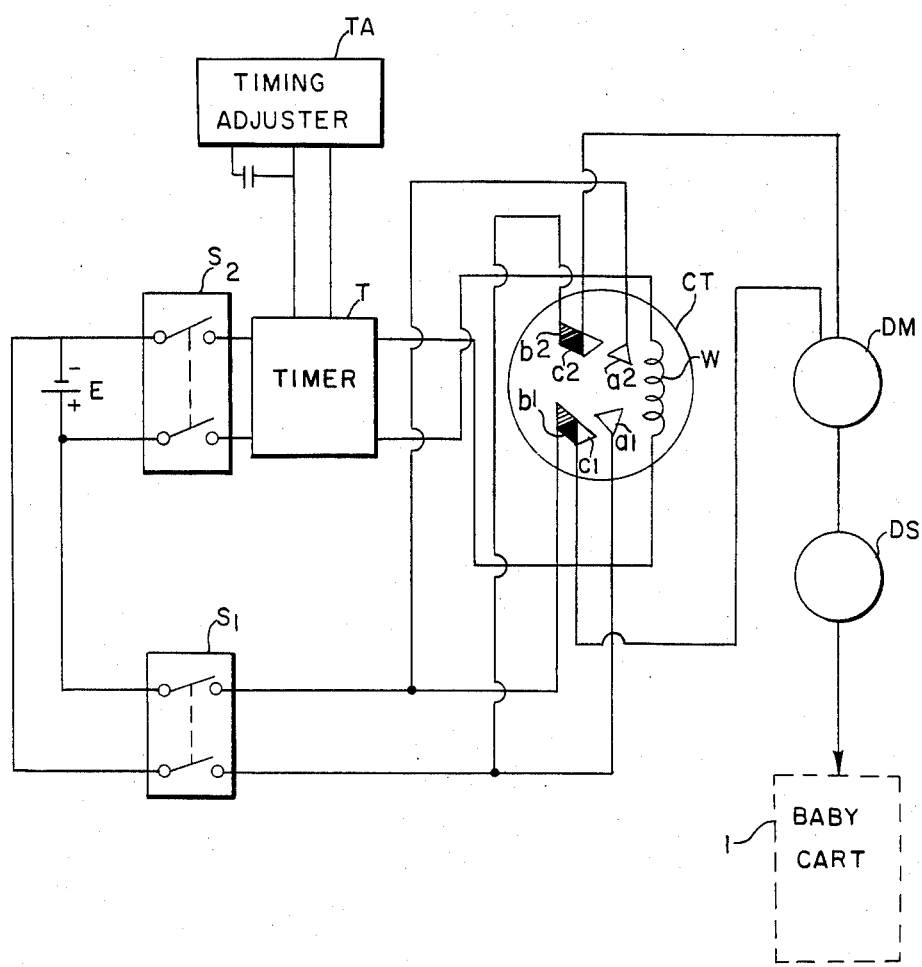
FIG. 2 is a schematic of one example of the control device of this invention.

FIG. 2 shows an example of a specific schematic as shown in FIG. 1. FIGS. 1 and 2 show the functions and purposes of the control device of this invention.

In order to make the baby cart advance straight forward (in the circumstances of no intention to push it manually outdoors), close $S_1$ (ON) and keep $S_2$ open (OFF). The power source E is applied to the motor DM through the junction point converter CT (in this example, the normal closed state of relay of 2a and 2b, i.e., two NC and two NO junction points are used through the common junction point $c_1$ of $b_1$ and the common junction point $c_2$ of $b_2$), so the motor DM rotates at once to actuate the baby cart forward after reducing speed through the speed reducer DS.

In order to make the baby cart move to-and-fro automatically, keep $S_1$ closed and close $S_2$, and the timer T is energized to act. For instance, in case of ON, the coil W of junction point state converter CT is closed, the junction point state changes at once, i.e., $b_1$, $c_1$ and $b_2$, $c_2$ originally in NO state are open (OFF), but $a_1$, $c_1$ and $a_2$, $c_2$ originally in NO state are closed (ON). The power source E is still applied to the motor DM through the junction point state converter CT, but the polarity of said power this time is opposite to that thereof when the original first switch $S_1$ is ON only, so the motor DM rotates reversely and the baby cart is actuated to reverse. Up to now, the cart has been advanced once and reversed once. However, the timer T is open (OFF) after a preset time, the coil W of junction point state converter CT is demagnetized to restore the original NO state of $b_1$, $c_1$ and $b_2$, $c_2$, so the baby cart is actuated to advance by the normal rotation of motor DM. In line with the ON/OFF timing control of timer T and through NC and NO junction points for a while respectively in the junction point state converter, the motor DM rotates forwardly and reversely, and the baby cart can automatically move to-and-fro in line with the time preset on the timer T (such a time is also the time required to move the cart to a certain distance), so as to achieve the expected effect. The time of timer T can be finely adjusted through the timer adjuster TA in line with the factual situation and the estimated movable distance.

This invention is further characterized by a unique operation to lock the wheels 12 of the baby cart with pinch plates 13 and to preset the time of timer T to close to zero seconds, such as 0.5–1 seconds, wherein the timer T is ON and OFF, respectively, for awhile, and the NO and NC junction points in the junction point state converter CT will follow to be ON for awhile. Obviously, when the NC junction point is ON and the motor DM is ready to rotate forwardly, because the NO junction point is in turn ON, the motor DM will be ready to reverse, but the original NC junction point will in turn be ON, and the motor DM will be ready to advance forwardly. Therefore, if the ON/OFF time of timer T is extremely short, the change of ON/OFF status of NC—NO—NC—NO . . . junction points in the junction point state converter CT is also extremely short, and the change of forward and reverse rotations of the motor DM is also extremely short. The motor DM does rotate, but the time of changing its forward and reverse rotations from each other is extremely short, and because of the frictional resistance of the baby cart wheels, which are locked by the pinch plates, in addition to the downward pressure of the weight of both baby and cart, this cart will not move; nevertheless, this cart per se above its wheels will vibrate to achieve another expected function and purpose of this invention.

Figure 3:
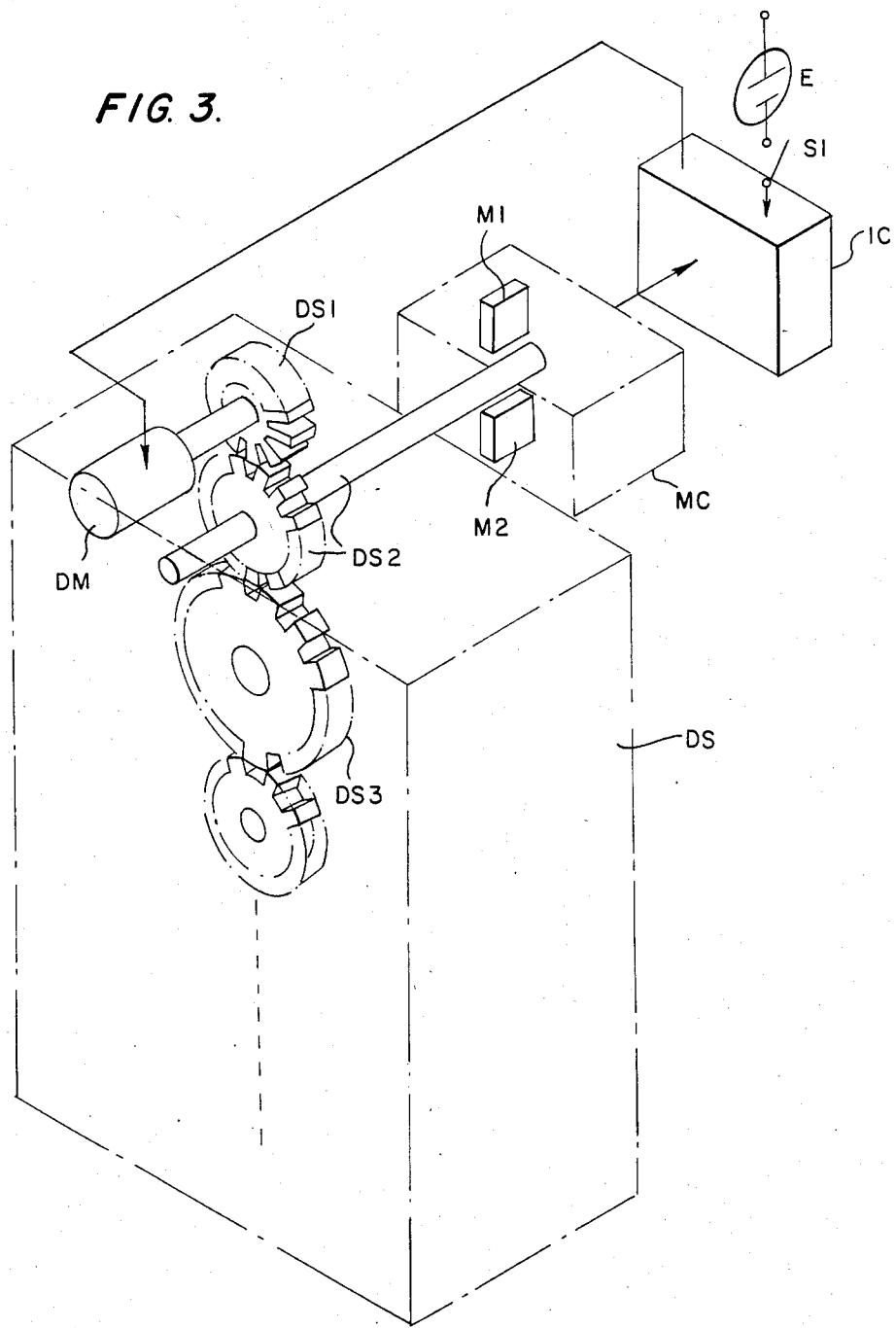
FIG. 3 is a schematic of another example of the control device of this invention.
Figure 4:
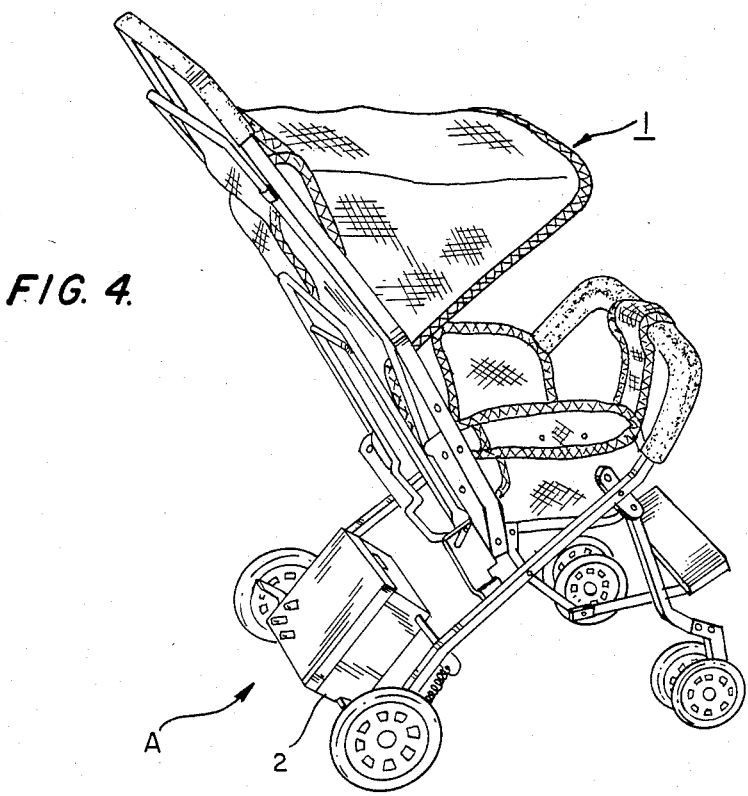
FIG. 4 is a perspective view of the structure of the control device of this invention installed on a baby cart.

As shown in FIG. 3, the timer T and the timer adjuster TA of Example 1 as shown in FIG. 2 are replaced by a magnetic counter MC of Example 2, and the junction point or state converter CT of the former is replaced by an integrated control circuit IC. Example 2 is only a further technical improvement of Example 1, so the basic spirit and connotative substance of both examples are the same.

Substantially, the magnetic counter MC is an electronic component for counting by making use of the change of magnetic field. According to the process of this invention, a shaft $DS_2$ connected to the center of the second gear (from the drive motor DM mandrel output connection) is extended from the reducing gear set DS into the magnetic counter MC with magnets $M_1$ and $M_2$.

When the first switch $S_1$ is closed and the power source E is applied to the motor DM through the integrated control circuit, the motor DM rotates to actuate the reducing transmission gear set DS, the mandrel $DS_2$ of the second transmission gear rotates in a direction (such as clockwise) in a coaxial manner. Such a clockwise rotation cuts the magnetic field of $M_1$ and $M_2$ so that the change of the magnetic field takes place, and in the magnetic counter MC, since the mandrel $DS_2$ rotates each revolution, the magnetic field changes once, i.e., to count once, so the counting function is achieved. Once a count is done, a signal is transmitted into the control circuit IC wherein when the preset time (i.e., distance) is reached, the power source between IC and DM is cut off to stop the movement of the baby cart. Similarly, the counterclockwise rotation of transmission mandrel $DS_2$ will do so, the only difference being the opposite change of magnetic field.

Why the second mandrel $DS_2$ from the motor DM output connection is chosen is that since the reducing gear set consists of a plurality of gears, the rotational velocity of the last gear (the one connected to the baby cart) is the slowest, but the rotational velocity of the first gear of motor DM output is too fast, so the extension of the slower second gear after being actuated serves as a sensor, and the error caused by the gearing chain of the last gear is smaller.

Only a few examples of this invention are described hereinbefore, but this invention is not limited to the contents mentioned above only. All of the technical modifications with the equivalent effect, such as that the timer is made in the electronic, mechanical or electric mechanical manner, and that the status converter CT is the relay type or non-contact point electronic type, are within the scope of this invention and the patent protection thereof.

I claim:

1. A variable automatic forward/reverse control device for a baby cart comprising:
    a power source to provide connected control units with power;
    a junction point or state converter comprising two-set normal closed and two-set normal opened junction points or states;
    a first switch to control the power source applied to a drive motor through the junction point or state converter; and
    a second switch to control the power source applied to a timer for timing On/Off in line with the preset time on a timing adjuster so as to control the power source On/Off of the junction point or state converter; whereby
    when the first switch is closed, the power source is applied to the motor through the two-set normal closed junction points of the junction point or state converter so as to make the motor rotate in one direction; when the second switch is closed, the timer is communicated with the power source for timing On/Off, the junction point or state converter converts junction point, i.e. the two-set normal closed junction points are opened, and another two-set normal opened junction points are closed; then the power source is applied to the motor but the polarity of power is in an opposite state, so the motor rotates reversely; in so doing, when the first and second switches are closed simultaneously, the motor has to automatically rotate to-and-fro forwardly and reversely in line with the preset time of the timer; and when the On/Off time of the timer is adjusted to be very short, the baby cart is under the downward pressure of weight of both baby and cart per se, and the wheels of the cart are locked by pinch plates, said cart vibrating in situ because the time cycle of converting the forward and reverse rotation of the motor for a while alternately is shorter.

2. The variable automatic forward/reverse control device for a baby cart as claimed in claim 1 wherein the junction point or state converter may be a relay or electronic state switching unit.

3. The variable automatic forward/reverse control device for baby cart as claimed in claim 1 wherein the timer, timing adjuster and junction point or state converter may be replaced with a magnetic counter and an integrated circuit control, a shaft connected to a second transmission gear driven by the motor is extended from the speed reducer into the magnetic counter of which the magnetic field is cut through the rotation of said second transmission gear for counting and thus transmitting signals to the integrated circuit control so as to control the power source switch or to change the polarity of power source applied to the said switch.

4. The variable automatic forward/reverse control device for a baby cart as claimed in claim 1 wherein the power source and motor are dc ones.

5. The variable automatic forward/reverse control device for a baby cart as claimed in claim 1 or 3 wherein the said device may be connected to an electronic music set or other acoustic or lamp members such as LED by making use of said power source or installing another power source.

* * * * *